US012763644B2

(12) United States Patent
Gardner

(10) Patent No.: US 12,763,644 B2
(45) Date of Patent: Oct. 13, 2026

(54) SUPPORT AND HEATSINK FOR AN INDEPENDENT CART SYSTEM

(71) Applicant: Rockwell Automation Technologies, Inc., Mayfield Heights, OH (US)

(72) Inventor: Eric Gardner, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 239 days.

(21) Appl. No.: 18/498,213

(22) Filed: Oct. 31, 2023

(65) Prior Publication Data

US 2025/0141309 A1 May 1, 2025

(51) Int. Cl.

| | |
|---|---|
| ***H02K 9/22*** | (2006.01) |
| ***B65H 54/02*** | (2006.01) |
| ***H02K 5/18*** | (2006.01) |
| ***H02K 5/20*** | (2006.01) |
| ***H02K 9/18*** | (2006.01) |
| ***H02K 9/19*** | (2006.01) |

(Continued)

(52) U.S. Cl.

CPC ............ *H02K 9/227* (2021.01); *B65H 54/02* (2013.01); *H02K 5/18* (2013.01); *H02K 5/203* (2021.01); *H02K 9/18* (2013.01); *H02K 9/19* (2013.01); *H02K 11/33* (2016.01); *H02K 41/031* (2013.01)

(58) Field of Classification Search

CPC .......... H02K 9/227; H02K 9/22; H02K 9/223; H02K 9/225; H02K 9/18; H02K 9/19; H02K 1/20; H02K 1/32; H02K 5/203; H02K 5/18; H02K 11/33; H02K 41/031; B65H 54/02

USPC ................................ 310/12.11, 12.29, 12.33

See application file for complete search history.

(56) References Cited

U.S. PATENT DOCUMENTS

| | | |
|---|---|---|
| RE39,747 E | 7/2007 | Peltier et al. |
| 9,511,681 B2 | 12/2016 | Wernerbach et al. |

(Continued)

FOREIGN PATENT DOCUMENTS

| | | |
|---|---|---|
| DE | 102005013349 A1 | 10/2006 |
| DE | 202012013152 U1 | 2/2015 |

(Continued)

OTHER PUBLICATIONS

European Patent Office Search Report for European Application No. 24208323 dated Mar. 25, 2025 (12 pages).

*Primary Examiner* — Michael Andrews
(74) *Attorney, Agent, or Firm* — Boyle Fredrickson, S.C.

(57) ABSTRACT

An independent cart system, including a track having multiple track segments and multiple movers operative to travel along the track, has a support system with a thermal transfer member and a support member for each track segment. The thermal transfer member transfers heat generated by switching devices mounted on a first surface to a second surface remote from the first surface. The switching devices selectively deliver current to coils spaced along each of the track segments. The support member has a base operative to engage a fixed location and a support extending away from the base. The support includes an inner surface, an outer surface, opposite the inner surface, and an upper surface proximate the second surface of the thermal transfer member. The upper surface is configured to engage a complementary surface, and the continuous surface and the complementary surface each have a smooth finish to provide contact therebetween.

19 Claims, 9 Drawing Sheets

(51) Int. Cl.
*H02K 11/33* (2016.01)
*H02K 41/03* (2006.01)

(56) References Cited

U.S. PATENT DOCUMENTS

| | | | | |
|---|---|---|---|---|
| 10,118,775 | B2 | 11/2018 | Walter et al. | |
| 11,104,524 | B2 | 8/2021 | Wernersbach et al. | |
| 2002/0043881 | A1* | 4/2002 | Asao | H02K 9/223 310/201 |
| 2005/0224222 | A1* | 10/2005 | Eaton | G03F 7/70858 165/272 |
| 2009/0315414 | A1* | 12/2009 | Shikayama | H02K 41/03 310/12.29 |
| 2014/0331888 | A1 | 11/2014 | Wernersbach et al. | |
| 2015/0077023 | A1 | 3/2015 | Wernersbach et al. | |
| 2015/0091393 | A1 | 4/2015 | Hayner et al. | |
| 2015/0280527 | A1* | 10/2015 | Lindblom | H02K 5/02 310/68 B |
| 2017/0081135 | A1 | 3/2017 | Wernersbach et al. | |
| 2019/0305661 | A1 | 10/2019 | Haya et al. | |
| 2020/0321846 | A1* | 10/2020 | Brinkmann | H02K 11/215 |
| 2022/0204284 | A1* | 6/2022 | Ganesan | B65G 47/642 |
| 2023/0412035 | A1* | 12/2023 | Liben | H02K 5/20 |

FOREIGN PATENT DOCUMENTS

| | | | |
|---|---|---|---|
| DE | 102017108557 | A1 | 10/2018 |
| DE | 102017108558 | A1 | 10/2018 |
| EP | 3741717 | | 11/2020 |
| EP | 4019314 | | 6/2022 |
| JP | 2008245474 | | 10/2008 |
| WO | 2018161160 | A1 | 9/2018 |

* cited by examiner

SUPPORT AND HEATSINK FOR AN INDEPENDENT CART SYSTEM

BACKGROUND INFORMATION

The subject matter disclosed herein relates to a support and heatsink for use in an independent cart system. More specifically, a support is provided for an individual track segment in the independent cart system which both stabilizes the track segment and removes excess heat generated by the linear drive system within the track segment.

As is known to those skilled in the art, motion control systems utilizing independent cart technology employ a linear drive system embedded in part within a track and in part within multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers. Each of the movers may be independently moved and positioned along the track in response to the electromagnetic fields generated by the coils.

Historically, independent cart technology has exploited the responsiveness and flexibility of the linear drive system in applications with relatively light payloads. The independent cart systems may be used, for example, in tandem with traditional conveyors to fill orders. Rapid acceleration and high-speeds allows individual products to be selected from storage and moved to packaging stations to fill custom orders. The packaged products may be loaded onto traditional conveyors and transported to vehicles for delivery. The lighter payloads do not require substantial force to achieve the desired acceleration and speeds for each vehicle. Lower forces require lower currents which, in turn, generate less heat within the linear drive system.

However, the success of independent cart technology with applications having lighter payloads has brought a desire to apply the technology to applications having greater payloads. For example, a first independent cart system may be utilized to fill an order, as previously discussed, and a second independent cart system, or an extension to the first system, may be utilized to deliver full boxes to the vehicles for delivery. These greater payloads require greater forces to achieve desired acceleration and speeds, and the greater forces require increased currents when compared to lighter payloads. Increased currents, in turn, result in increased heating within the linear drive system. Further, the increased payload creates increased mechanical stresses and vibrations as the greater payload travels along the track for the independent cart system.

Thus, it would be desirable to provide an improved support structure and heatsink for the track in an independent cart system.

BRIEF DESCRIPTION

According to one embodiment of the invention, a support system for an independent cart system is disclosed. The independent cart system includes a track having multiple track segments and multiple movers operative to travel along the track. The support system includes a thermal transfer member and a support member for each track segment. The thermal transfer member includes a first surface operative to receive multiple switching devices, a second surface remote from the first surface, and a thermal transfer body extending between the first surface and the second surface. The switching devices selectively deliver current to coils spaced along each of the track segments. The support member has a base operative to engage a fixed location and a support extending away from the base. The support includes an inner surface, an outer surface, opposite the inner surface, and an upper surface proximate the second surface of the thermal transfer member. The upper surface has a first side edge, a second side edge, the second side edge opposite the first side edge, a first end, a second end, the second end, opposite the first end, and a continuous surface extending between the first side edge, the second side edge, the first end, and the second end. The upper surface is configured to engage a complementary surface, and the continuous surface and the complementary surface each have a smooth finish to provide contact therebetween.

According to another embodiment of the invention, a method for removing heat from a track segment in an independent cart system includes conducting heat generated by multiple switching devices between a first surface and a second surface of a thermal transfer member in a track segment for the independent cart system. The switching devices selectively deliver current to multiple coils spaced along a length of the track segment. The switching devices are mounted to the first surface, and a thermal transfer body extends between the first surface and the second surface. The track segment is supported with a support member extending between a fixed location and the track segment, and heat is transferred from the second surface of the thermal transfer member to an upper surface of the support member.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
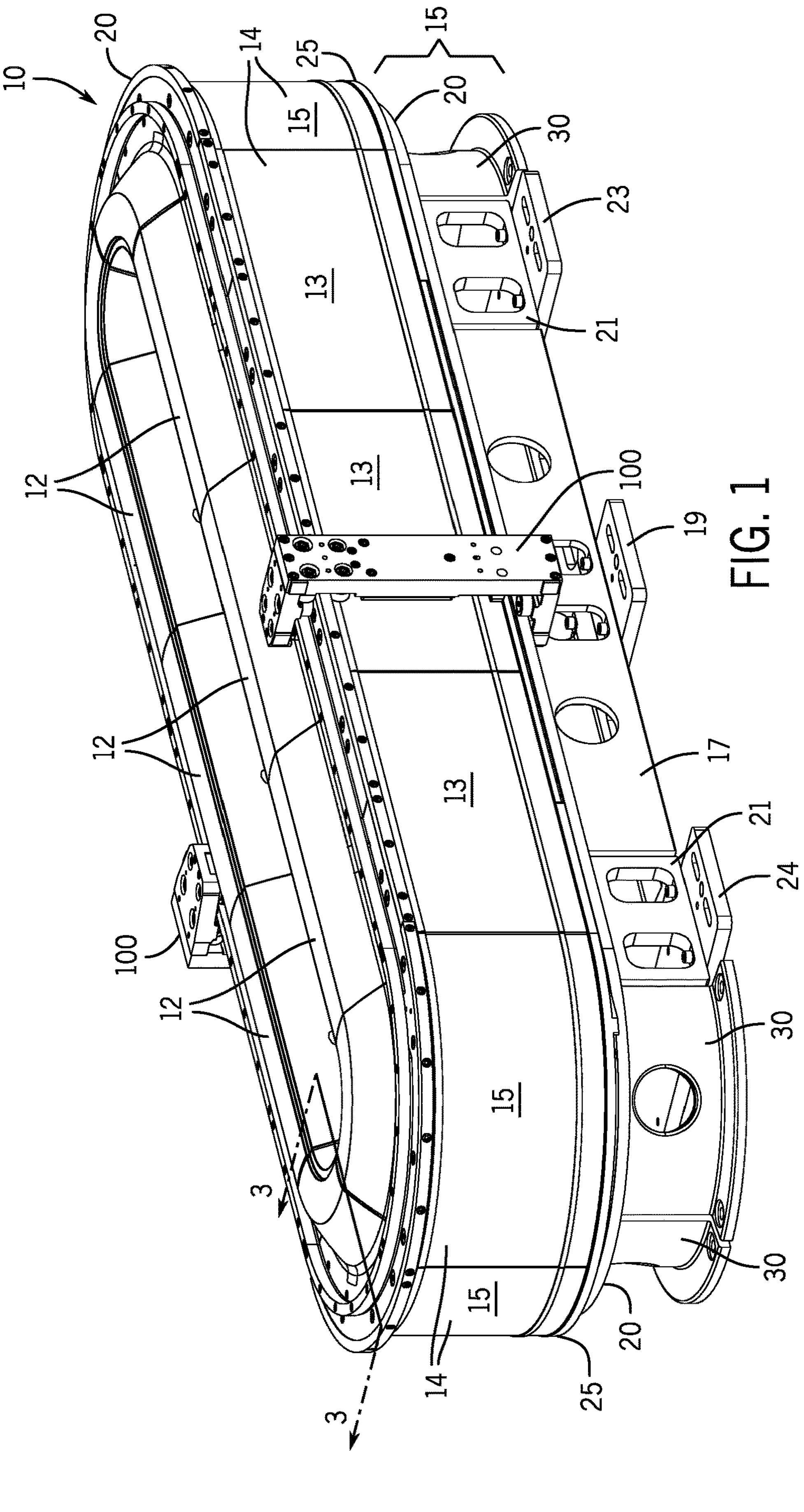
FIG. 1 is a perspective view of an exemplary independent cart system incorporating one embodiment of the present invention.
Figure 2:
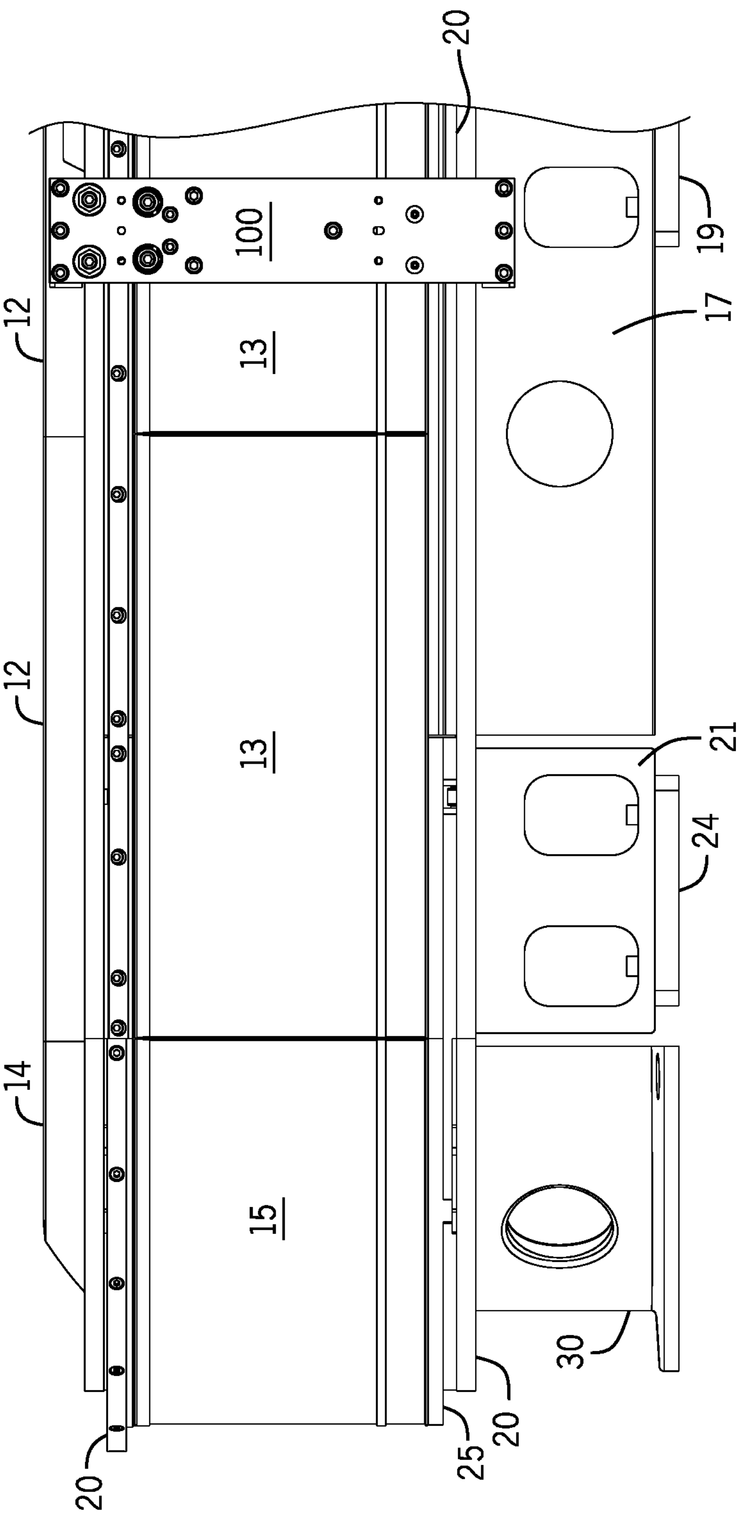
FIG. 2 is a partial side elevation view of the exemplary independent cart system of FIG. 1.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved support structure and heatsink for the track in an independent cart system. Turning initially to FIG. 1, an exemplary transport system for moving articles or products includes a track 10 made up of multiple segments 12, 14. The illustrated track 10 includes six straight track segments 12, with three straight track segments located along each side of the track. The track 10 also includes four curved track segments 14 where each curved track segment 14 forms a ninety degree bend. A pair of curved track segments 14 form a one hundred eighty degree bend and each pair of curved track segments 14 connects the straight track segments 12 an either side of the track at one end of the track. The six straight track segments 12 and the four curved track segments 14 form a generally oval track and define a path along which each of the movers 100 may travel. It is understood that track segments of various sizes, lengths, and shapes may be connected together to form a track 10 without deviating from the scope of the invention.

The illustrated track 10 is oriented in a horizontal plane and supported above the ground by a base 15 extending vertically downward from the track 10. According to the illustrated embodiment, the base 15 includes a pair of generally planar support plates 17, located on opposite sides of the track 10. Each support plate 17 forms a first support member and spans multiple straight track segments 12. A mounting foot 19 is provided on the bottom of each support plate 17 to secure the support plate and, in turn, to secure the track 10 to a surface. The base 15 also includes an end support structure with a second support member 21 extending downward from the track and a second mounting foot 24 to secure the second support member 21 to a surface. An arched support member 25 is mounted on the top of each second support member 21 and extends between a pair of second support members 21, where one of the second support members 21 is positioned on each side of the track 10. The arched support member 25 generally follows the curvature of the curved track segment 14. The base 15 further includes a curved support member 30 positioned under each of the curved track segments 14. As will be discussed in more detail below, each curved track segment 14 provides improved support for each curved track segment 14 and further serves as a heatsink for the corresponding curved track segment 14.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, rails 20 extend generally along the outer periphery of the track 10. A first rail 20 extends along an upper surface of each segment and a second rail 20 extends along a lower surface of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. Each mover 100 includes complementary rollers 110 to engage the rail 20 for movement along the track 10.

Figure 9:
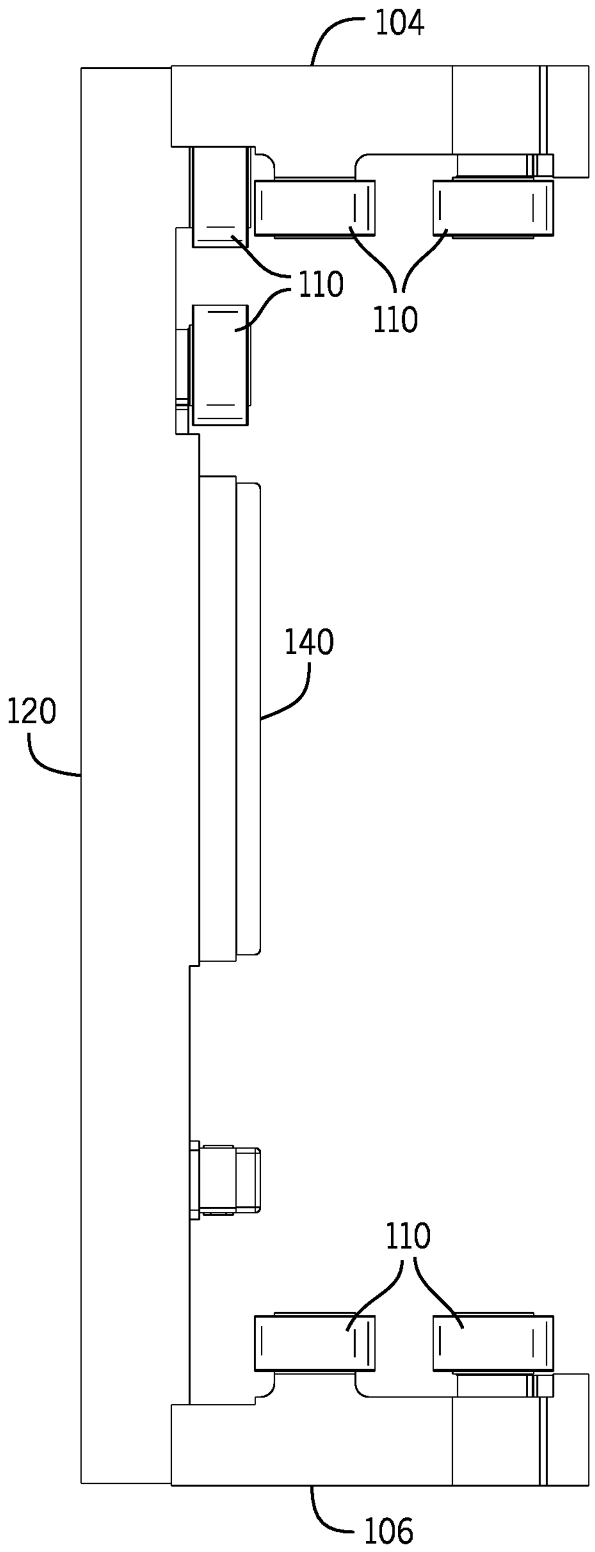
FIG. 9 is a side elevational view of a mover from the exemplary independent cart system of FIG. 1.

One or more movers 100 are mounted to and movable along the rails 20 on the track 10. With reference to FIG. 9, an exemplary mover 100 is illustrated. Each mover 100 includes a side member 102, a top member 104, and a bottom member 106. The side member 102 extends for a height at least spanning a distance between the rail 20 on the top surface of the track 10 and the rail 20 on the bottom surface of the track 10 and is oriented generally parallel to a side surface when mounted to the track 10. The top member 104 extends generally orthogonal to the side member 102 at a top end of the side member 102 and extends across the rail 20 on the top surface of the track 10. A first set of rollers 110 are mounted on the lower side of the top member 104 and are configured to engage a first portion of the rail 20 along the upper surface of the track segment. The first set of rollers 110 includes two rollers arranged to engage either side of a vertical portion of the rail 20, where the vertical portion of the rail extends away from the upper surface of the track segment. A second set of rollers 110 are mounted on the side member 102 proximate the top member 104. The second set of rollers 110 includes two rollers arranged to engage either side of a horizontal portion of the rail 20 along the upper surface of the track, where the horizontal portion extends away from a side of the track segment. The bottom member 106 extends generally orthogonal to the side member 102 at a bottom end of the side member 102 and extends across the rail 20 on the bottom surface of the track 10. A third set of rollers 110 are mounted on the upper side of the bottom member 106 and are configured to engage the rail 20 along the bottom surface of the track 10. The third set of rollers 110 includes two rollers arranged to engage either side of the rail 20, where the rail 20 on the bottom surface of the track segment is generally vertical and extends away from the bottom surface of the track segment. The three sets of rollers 110 act together to engage the various surfaces of the rails 20 to both allow the mover 100 to travel along the rails 20 and to maintain the orientation of the mover 100 with respect to the track 10.

A linear drive system is incorporated in part on each mover 100 and in part within each track segment 12, 14 to control motion of each mover 100 along the track segment. According to one aspect of the invention, the linear drive system includes drive magnets 140 mounted to the side member 102. The drive magnets 140 are arranged in a block along an inner surface of the side member 102. The drive magnets 140 are typically permanent magnets with separate magnet segments alternately having a north pole, N, and south pole, S, pole facing the track segment 12. Optionally, the drive magnets 140 may be arranged as a Halbach array, concentrating the magnetic flux generated by the magnets toward each track segment. The drive magnets 140 are mounted on the inner surface of the side member 102 and when mounted to the track 10 are spaced apart from a series of coils 50 extending along the track 10 (see FIG. 3). On the track 10, the linear drive system includes a series of parallel coils 50 spaced along each track segment 12, 14. Each coil 50 is placed in a channel 23 extending longitudinally along one surface of the track segment 12, 14. The electromagnetic field generated by each coil 50 spans an air gap between the drive coils 50 and the drive magnets 140 and interacts with the magnetic field generated by the drive magnets 140 to control operation of the mover 100.

In operation, a segment controller is provided in each track segment 12, 14 to control the current delivered to each coil 50 and, in turn, to control the electromagnetic field generated by the coils 50. The segment controller receives power from a DC bus and controls switching devices which may be a solid-state device that is activated by the switching signal, including, but not limited to, transistors, thyristors, or silicon-controlled rectifiers. According to one aspect of the invention, a power module 90 or a series of power modules are provided along a length of the track segment 12, 14. Each power module 90 houses one or more of the switching devices. The power module 90 receives a DC voltage, for example, from a DC bus interconnected between track segments and receives control signals for each of the switching devices. The control signals selectively activate the switching device to allow current to flow from the DC bus to the coil 50. As is known in the art, the control signals are generated using modulation to selectively connect and disconnect the DC bus to each coil 50, resulting in a desired current flowing in each coil 50 which, in turn, generates an electromagnetic field. The current is selectively provided to successive coils 50 along a length of each track segment to create a "moving" electromagnetic field, which travels along the length of each track segment. The moving electromagnetic field interacts with the drive magnets 140 on each mover 100 to propel each mover along the corresponding track segment.

This selective activation and deactivation of the switching devices creates switching losses, which result in energy loss in the power module 90. Additional energy is lost in the power module 90 as a result of conduction losses during periods in which each switching device is conducting current. The energy losses are typically realized as electrical energy being converted to heat energy within the power module 90. In addition, increasing payloads carried by the movers 100 along with increased speeds and/or acceleration of each mover requires increased forces from the linear drive system. The increased forces are realized by increasing the amplitude of current conducted by the switching devices which generates an increased level of energy loss in the power module 90. The heat energy must be dissipated away from the power module 90 to avoid damage to the switching devices.

Figure 3:
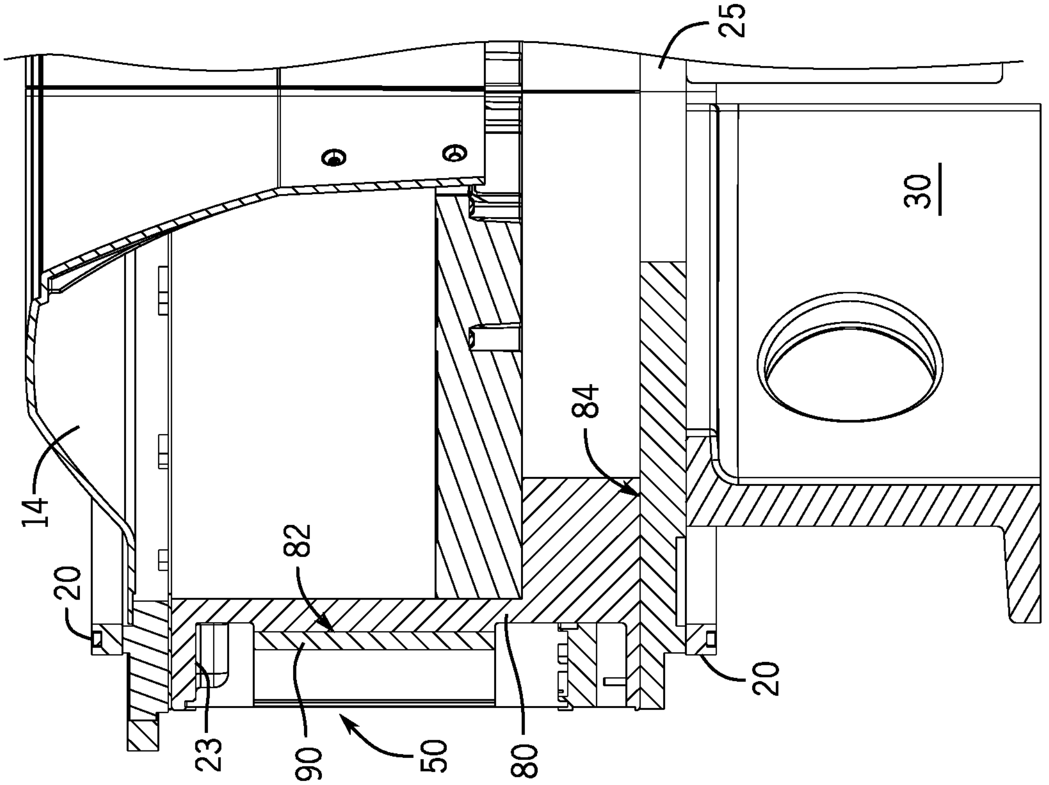
FIG. 3 is a partial sectional view of the exemplary independent cart system taken at 3-3 of FIG. 1.
Figure 5:
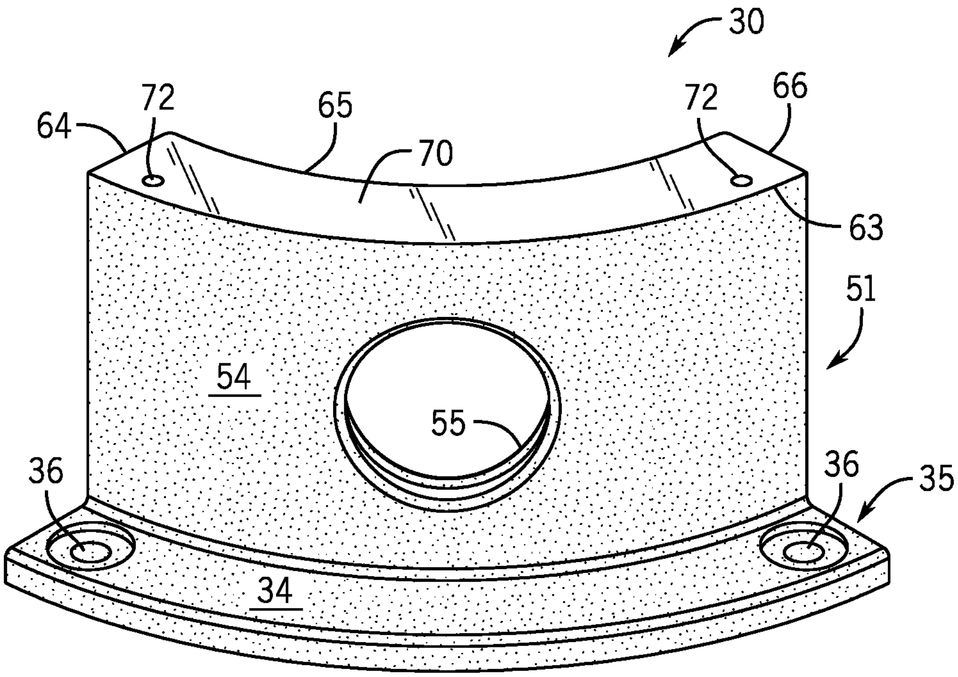
FIG. 5 is a view from the top and front of the curved support member in FIG. 1.
Figure 6:
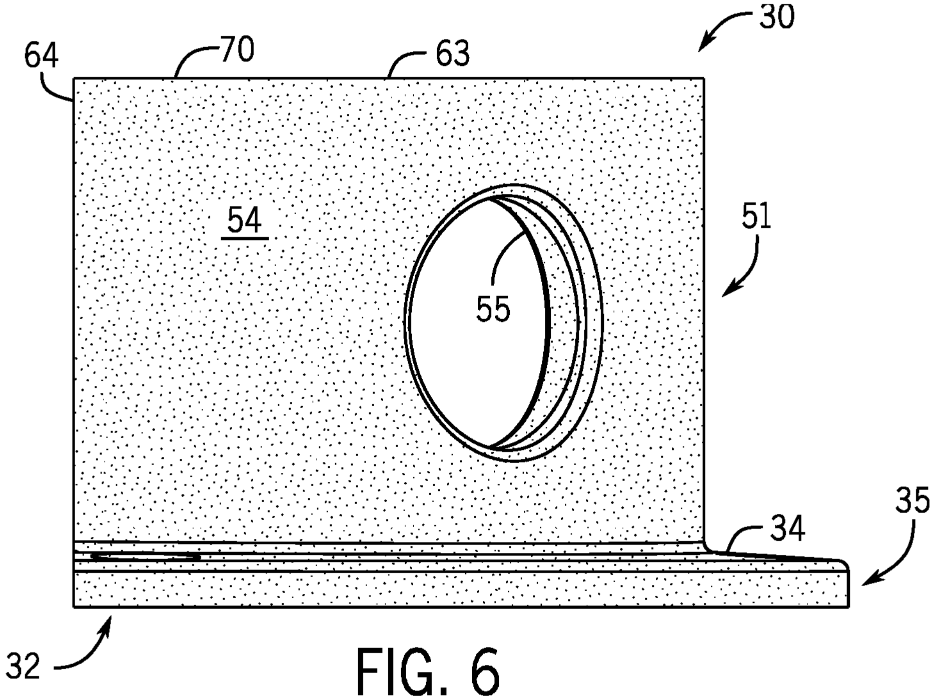
FIG. 6 is a side elevational view of the curved support member of FIG. 5.
Figure 7:
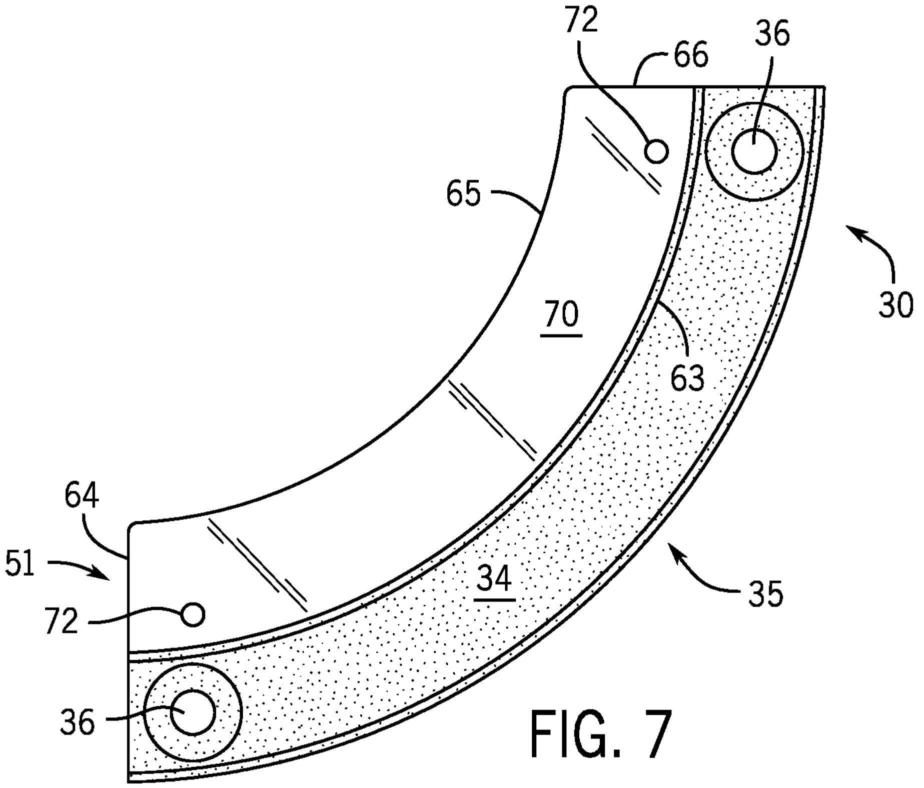
FIG. 7 is a top plan view of the curved support member of FIG. 5.
Figure 8:
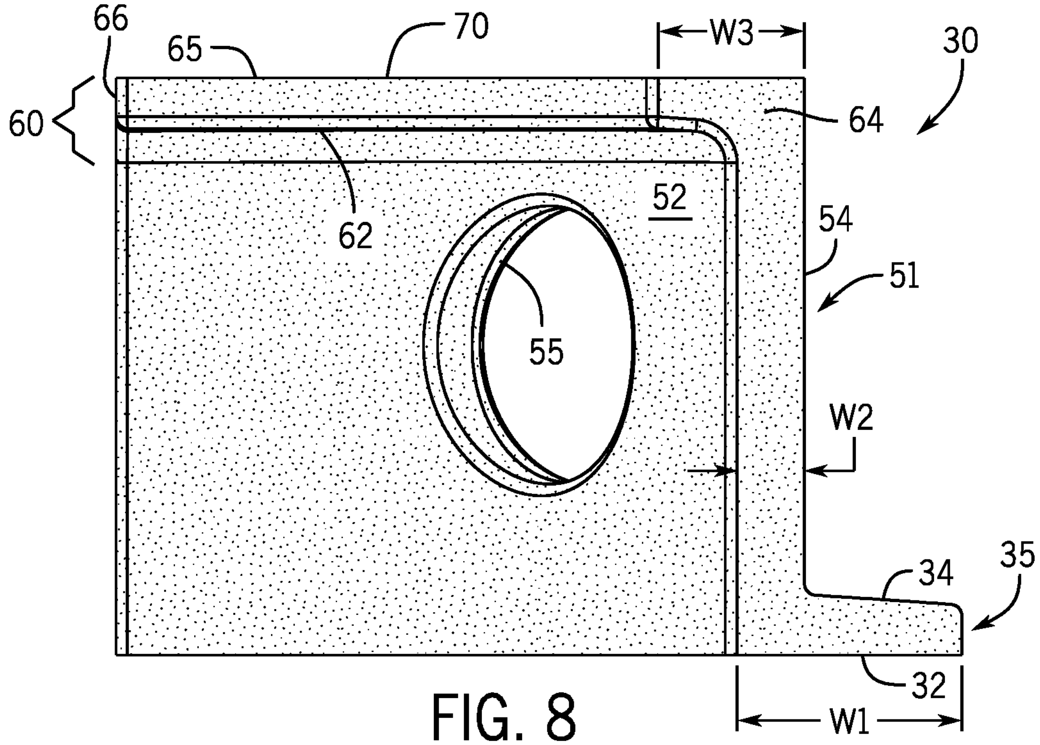
FIG. 8 is an end elevational view of the curved support member of FIG. 5.

With reference still to FIG. 3, each power module 90 is mounted to a thermal transfer member 80 within the track segment 12, 14. As indicated above, the coils 50 are mounted in the channel 23 extending longitudinally along the side of each track segment 12, 14. The power modules 90 are mounted proximate to the coils 50 and, according to the illustrated embodiment, the power modules 90 are mounted behind the coils 50 and within the channel 23 along the side of each track segment 12, 14. Each power module 90 is mounted to a first surface 82 of the thermal transfer member 80. The first surface 82 of the thermal transfer member 80 is oriented toward the channel 23 and toward the side of the track segment 12, 14. A body of the thermal transfer member 80 extends down to the bottom of the track segment 12, 14 and includes a second surface 84, positioned remote form the first surface, and facing downward toward the bottom of the track segment 12, 14. The thermal transfer member 80 may be manufactured from aluminum, an aluminum alloy, steel, a ferrous alloy, or any other suitable material to conduct the heat away from the power modules 90 between the first surface 82 and the second surface 84 of the thermal transfer member 80. The thermal transfer member 80 may be cast as a single structure, extruded, or machined from a solid block to form the thermal transfer member. According to one aspect of the invention, the thermal transfer member 80 may be a side wall of the track segment 12, 14. An exterior plate 13, 15 may be fit over the channel 23 on each track segment 12, 14 to cover the coils and power module 90. The side wall of the track segment 12, 14 defines, at least in part, the channel 23 and provides support for the track segment. A lower surface of the side wall defines the second surface 84 of the thermal transfer member.

After conducting the heat from the first surface 82 to the second surface 84 of the thermal transfer member 80, the heat needs to be conducted away from the track segment 12, 14. As discussed above, each end of the illustrated track 10 includes an end support structure with a second support member 21 and an arched support member 25 mounted on the top of each second support member 21. As shown in FIG.

3, the curved track segment 14 is mounted on top of the arched support member 25, and the second surface 84 contacts the arched support member 25. A curved support member 30 may be provided between the arched support member 25 and the ground, or other fixed location, to which the independent cart system is mounted. An upper surface 70 of the curved support member 30 engages a lower surface of the arched support member 25. Heat generated by the power modules 90 is, therefore, conducted through the arched support member 25 to the curved support member 30 and dissipated into the ambient air around the curved support member 30. According to another aspect of the invention, the curved support member 30 may be mounted directly under the curved track segment 14, such that an upper surface 70 of the curved support member 30 directly engages the second surface 84 of the thermal transfer member 80.

To maximize thermal transfer between the track segment 12, 14 and one or more support members, it is desirable to have efficient thermal transfer between the elements. According to one aspect of the invention, each complementary surface, which engages another surface for thermal transfer, is planar. The second surface 84 of the thermal transfer member 80 may be planar and engage a planar upper surface of the arched support member 25. The upper surface 70 of the curved support member 30 may be planar and engage a planar lower surface of the arched support member. Each pair of planar surfaces maximizes surface area in direct contact between the two surfaces, thereby increasing thermal conductivity between the two surfaces.

Figure 4:
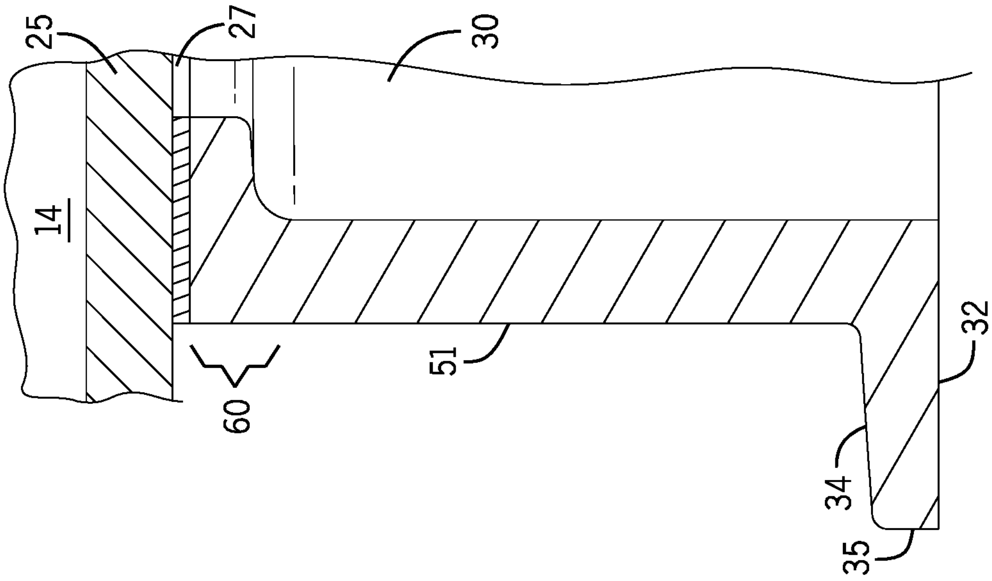
FIG. 4 is a partial elevation view of a curved support member and a track segment of FIG. 1 with a thermally conductive material between the curved support member and the track segment.

According to another aspect of the invention, a thermally conductive substrate 27 may be included between two of the surfaces. With reference also to FIG. 4, a thermally conductive substrate 27 is shown between the upper surface 70 of the curved support member 30 and the lower surface of the arched support member 25. The thermally conductive substrate 27 may similarly be inserted between the upper surface of the arched support member 25 and the track segment 12, 14. Optionally, if the arched support member 25 is omitted, the thermally conductive substrate 27 may be inserted directly between the curved support member 30 and the track segment 12, 14. The thermally conductive substrate may be a liquid, such as a thermal grease, or a flexible material, such as a thermally conductive sheet material inserted between the two members. Fasteners, connecting the two members, may compress the thermally conductive substrate 27 or force the thermally conductive substrate to fill voids present between the two members, improving heat transfer between the two members.

Turning next to FIGS. 5-8, one embodiment of the curved support member 30 is illustrated. According to one aspect of the invention, the curved support member 30 is manufactured as a single member. The curved support member 30 is a metal support structure manufactured, for example, from aluminum or an aluminum alloy. The curved support member 30 may be cast as a single structure or extruded to form the curved support member. The curved support member 30 has a base 35 and a support 51. The base 35 includes a generally planar lower surface 32 to engage the ground or other mounting surface for the track 10 and an upper surface 34 opposite the lower surface. The base 35 extends under the support 51 and protrudes from the support 51 for a first width, W1. At least one opening 36 extends through the base 35. The illustrated embodiment includes two openings 36; however, the number of openings 36 may be greater than or less than two. A fastener, such as a bolt, may pass through the opening 36 with a head of the bolt engaging the upper surface 34 or a recess in the upper surface surrounding the opening. The fastener secures the base 35 and, in turn, the curved support member 30 to a mounting surface.

The support 51 extends away from the base 35 in a generally orthogonal direction to the lower surface 32 of the base. The support 51 has a second width, W2, less than the first width, W1, of the base 35. According to the illustrated embodiment, an inner surface 52 of the support 51 extends in a continuous manner from an inner surface of the base 35, such that the two inner surfaces define a continuous surface extending from the ground, or other mounting surface, to an upper segment 60 of the support. The support 51 has an outer surface 54, opposite the inner surface 52 defining the width, W2, of the support. An opening 55 extends between the inner surface 52 and the outer surface 54. The opening 55 allows access to the track segment 14 mounted on the curved support member 30, facilitating, for example, passage of cabling through the support 51 to the track segment 14.

The upper segment 60 of the support 51 extends inward, such that the upper segment 60 has a third width, W3, where the third width, W3 is greater than the second width, W2, of the support 51. The upper segment 60 has a lower surface 62 and an upper surface 70 opposite the lower surface. The upper surface 70 of the upper segment 60 additionally defines the upper surface of the curved support member 30. The upper surface 70 is defined by a first side edge 63, where the first side edge is curved and located between the outer surface 54 and the upper surface 70 of the support 51, and a second side edge 65, where the second side edge is curved and located between the inner surface 52 and the upper surface 70 of the support 51. The upper surface 70 further has a first end 64, extending between the first side edge 63 and the second side edge 65, and a second end 66, also extending between the first side edge 63 and the second side edge 65, where the first and second ends 64, 66 are located at opposite ends of the curved support member 30. A pair of openings 72 are located in the upper surface 70, where the openings 72 allow for a fastener to secure the curved track segment 14 to the curved support member 30. An inner periphery of each opening 72 may be threaded to receive a complementary threaded fastener extending through a corresponding opening in a lower surface of the curved track segment 14.

The curved support member 30 is configured to follow a curvature of the curved track segment 14. According to one aspect of the invention, the curved track segment 14 has a first curvature following a continuous bend radius along the ninety-degree bend. The curved support member 30 has a second curvature which similarly follows a continuous bend radius, corresponding to the bend radius of the first curvature, along the ninety-degree bend. Optionally, the curved track segment 14 has a first curvature with a modified spline geometry, where multiple spline segments each having a different bend radius span the ninety-degree bend. One such example of a curved track segment 14 with a modified spline segment is disclosed in U.S. Pat. No. 9,511,681, assigned to Rockwell Automation, Inc., the contents of which is incorporated herein in its entirety. The curved support member 30 may have a second curvature corresponding to the first curvature such that the curved support member has multiple spline segments each having a different bend radius.

The independent cart system is commonly used in a manufacturing environment. In some applications, the independent cart system may be subject to high temperatures, a wide range of temperatures, liquids, a variable ambient environment, or other operating conditions which may corrode the surface of the curved support member. As a result, it may be desirable to provide an anodized finish or other protective surface treatment, such as paint, on the curved support member. The anodized finish, however, has a much lower thermal conductivity than the thermal conductivity of an untreated surface for the curved support member 30. Anodizing the contacting surface would decrease the efficiency of heat transfer to the curved support member. Therefore, the curved support member 30 may be subjected to an anodizing or other protective process on each surface except the upper surface 70 and the lower surface 32. Optionally, all surfaces of the curved support member 30 may initially be treated and the upper surface 70 and the lower surface 32 may have a subsequent operation, such as grinding, polishing, or machining to remove the protective surface. When the curved support member 30 is mounted to the track segment 12, 14 or to the arched support member 25, the upper surface 70 engages the complementary surface on the track segment 12, 14 or arched support member 25. Thus, the entire curved support member 30 is protected, either via the anodized or other protective layer or via connection to the additional member being supported by the curved support member.

In addition to providing a protective layer on the curved support member 30, the anodized surfaces provide improved thermal dissipation via radiation from each of those surfaces as well. The anodization process creates an oxide layer on the treated surfaces which has microscopic texturing. This property of the oxide layer increases the overall surface area and the emissivity of the treated surface when compared to a smooth, untreated surface, resulting in an increase in heat dissipation. Additional heat dissipation from the curved support member 30 reduces the temperature of the curved support member 30 and, in turn, creates a greater thermal gradient between the thermal transfer member 80 and the curved support member 30. An increased thermal gradient causes an increase in thermal conduction between the two members. Thus, the anodized layer, or other high emissivity surface treatment, improves heat transfer from the track segment 12, 14 to the curved support member 30.

Figure 10:
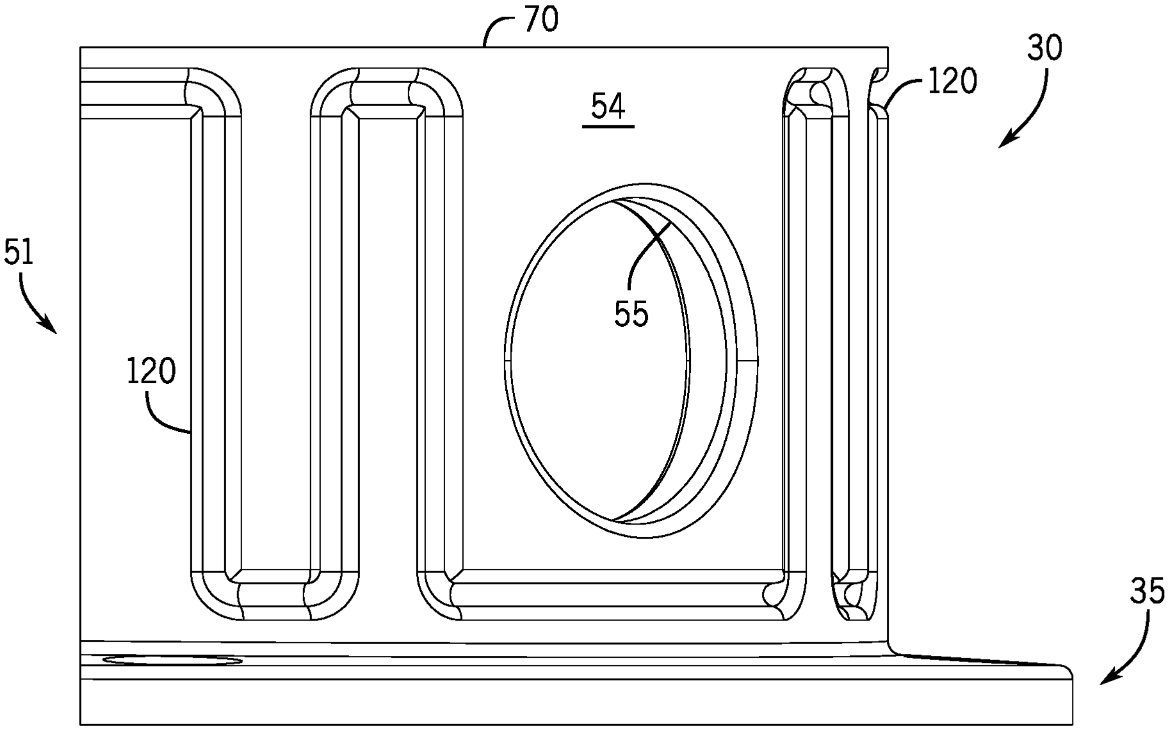
FIG. 10 is a side elevational view of another embodiment of the curved support member with a channel for liquid cooling of the curved support member.
Figure 11:
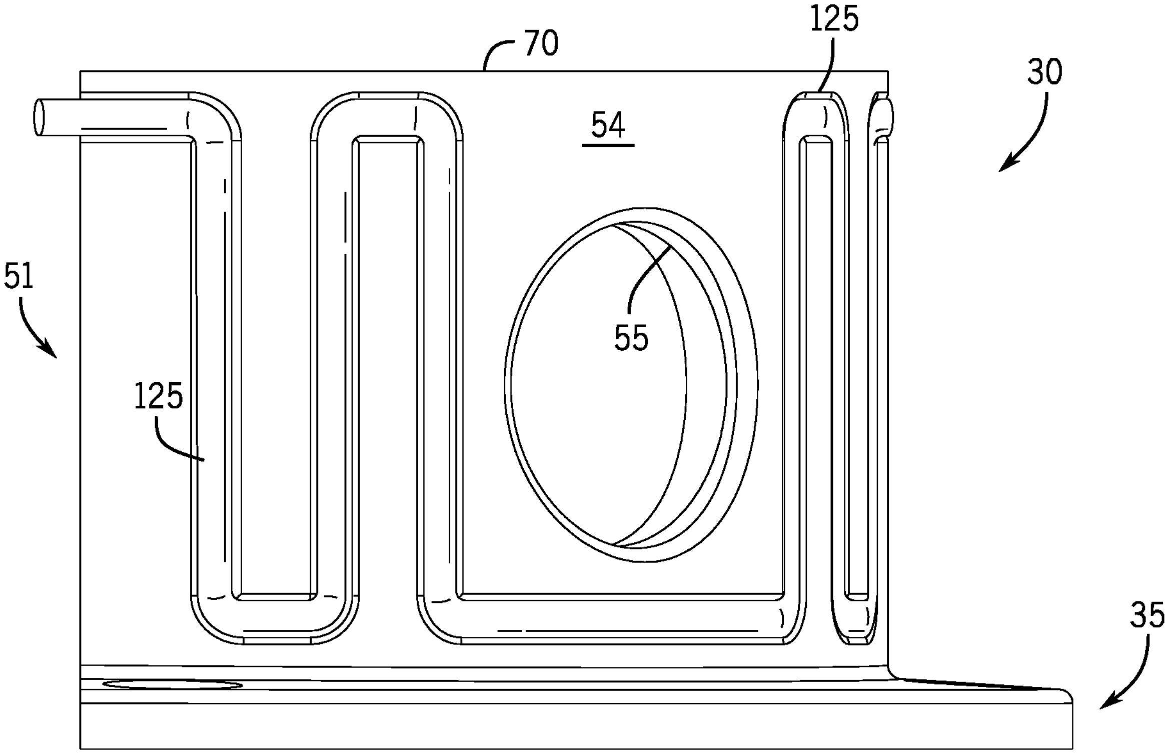
FIG. 11 is a side elevational view of the curved support member of FIG. 10 with a cooling pipe fit in the channel for liquid cooling.

Referring next to FIGS. 10-14, still additional features may be implemented with the curved support member 30 to improve thermal dissipation from the curved support member. With reference first to FIGS. 10 and 11, the curved support member 30 may be modified to include liquid cooling of the support 51. During casting, cavities may be formed within the support 51 as fluid passages. Fittings may be fit on openings to the passages, allowing adjacent supports members 30 to connect to each other or to allow external tubing to connect to a fluid passage. Optionally, a channel 120 may be formed during the casting process or machined in surface after the casting process. The channel 120 may be formed in either the inner surface 52 or the outer surface 54 of the support 51. A tube 125 may be fit within the channel 120 providing a passage through which fluid may flow. Coolant is introduced within the fluid passage or within the tubing 125, where the coolant absorbs heat from the support 51 as it flows through or adjacent to the support 51. The coolant is pumped to a chiller unit which extracts the heat and recirculates the coolant through the fluid passages in the support member 30.

Figure 12:
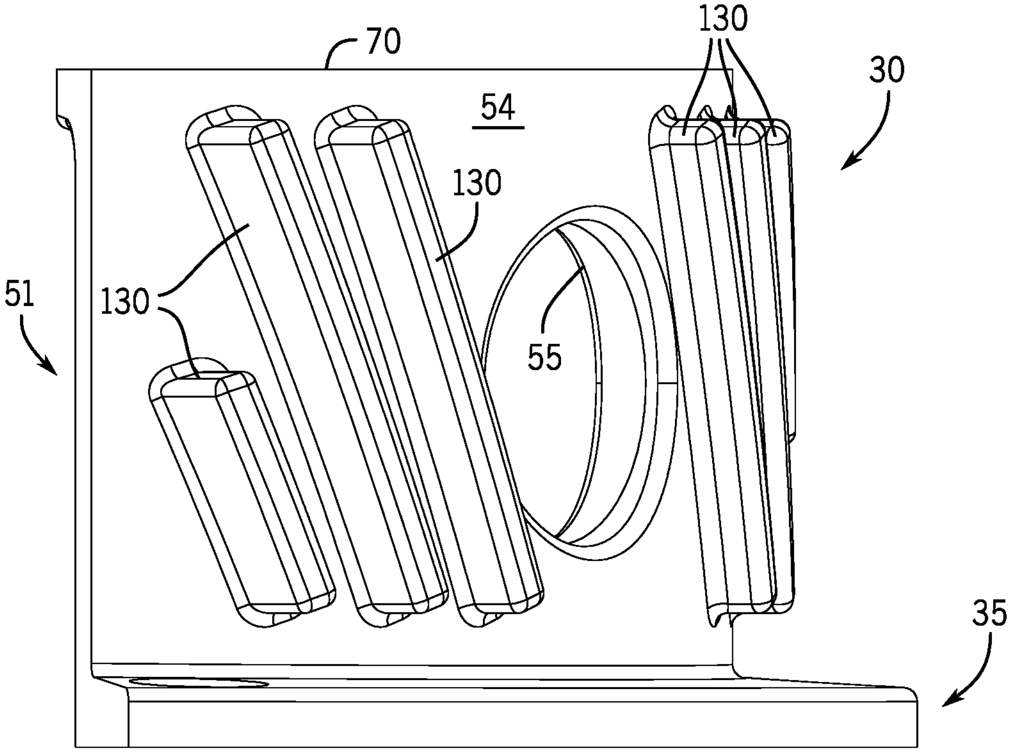
FIG. 12 is a side elevational view of another embodiment of the curved support member with a first configuration of fins for cooling of the curved support member.
Figure 13:
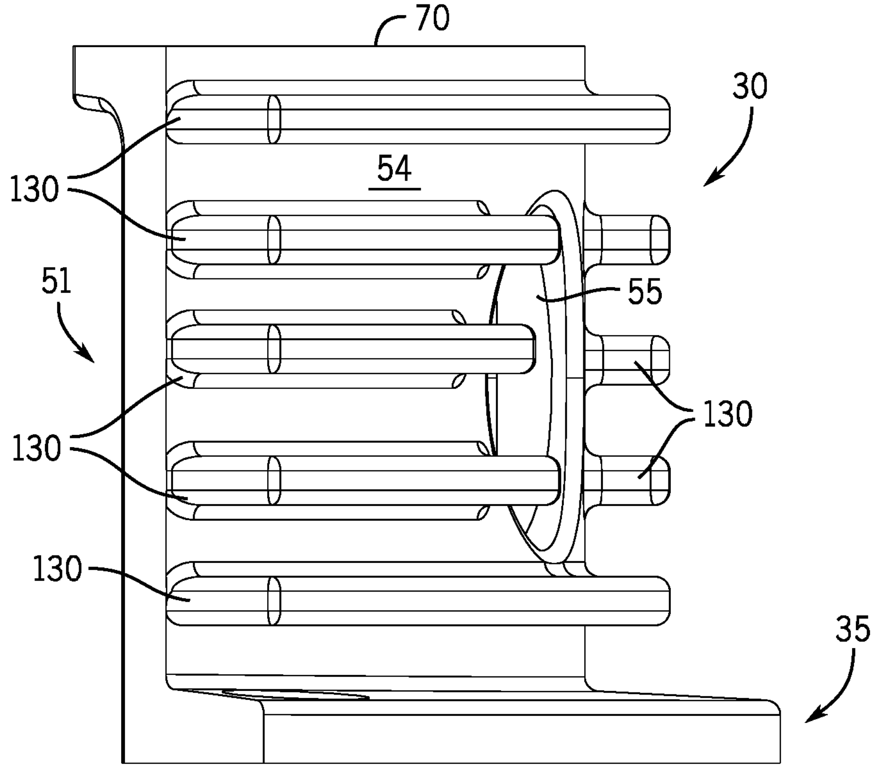
FIG. 13 is a side elevational view of another embodiment of the curved support member with a second configuration of fins for cooling of the curved support member.
Figure 14:
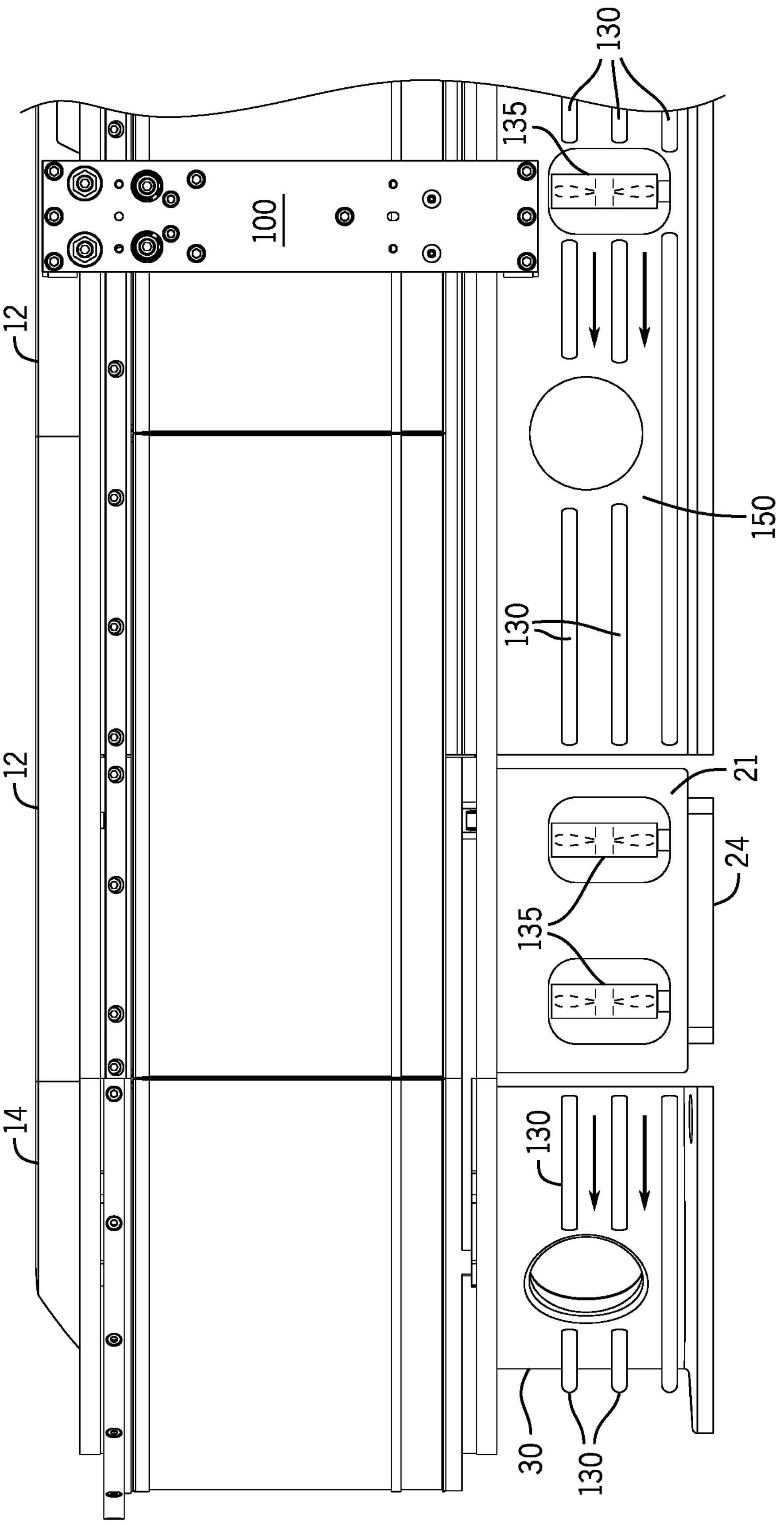
FIG. 14 is a side elevation view of an exemplary independent cart system incorporating the support members of FIG. 13 along with fans for cooling of the support members.

According to still another aspect of the invention, the support member 30 may include fins 130. With reference to FIG. 12, the fins 130 may be arranged in a near-vertical orientation. Heat radiated from either side of the fin rises and is dissipated from the support member. With reference to FIG. 13, the fins 130 may be arranged in a horizontal orientation. With reference also to FIG. 14, fins 135 may be mounted along the base 15 to establish an airflow between the horizontally mounted fins 135. The illustrated fins are not intended to be limiting. The fins 135 may be included on the support 51 in different orientations, having different numbers, and different thicknesses without deviating from the scope of the invention. The support members 30 may use natural radiation of heat from the fins 130 or include fins 135 for air-cooling and increased heat transfer from the fins 135.

As also seen in FIG. 14, it is contemplated that one or more side support members 150 may have a configuration consistent with the curved support member 30 discussed above. The side support members 150 may replace the planar support member 17 and mounting foot 19 shown in FIG. 1. The side support members 150 may be configured to mount to a straight track segment 12 and provide improved heat transfer from the straight track segments 12.

As discussed above, the base 15 may include an arched support member 25 mounted on the top of each second support member 21 to provide support for the curved track segments 14. With lower payloads and/or lower speeds, the arched support member 25 may provide sufficient support for each end of the illustrated track 10. The increasing payloads carried by the movers 100 along with increased speeds and/or acceleration of each mover creates increased mechanical forces and vibrations on the track segments 14 as a mover 100 travels along the track segment. The curved support member 30 is provided between the arched support member 25 and the ground, or other fixed location, to which the independent cart system is mounted. In addition to removing heat from the curved track segments 14, the additional curved support member 30 provides increased stability and rigidity of the curved track segments 14. The curved support member 30 reduced vibrations and improves stability of the curved track segment 14. As shown in FIG. 3, the curved track segment 14 is mounted on top of the arched support member 25, and the curved support member 30 is positioned under each of the arched support members 25.

According to another aspect of the invention, the curved support member 30 may be mounted directly under the curved track segment 14, removing the arched support member.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A support system for an independent cart system, wherein the independent cart system includes a track having a plurality of track segments and a plurality of movers operative to travel along the track, the support system comprising for each of the plurality of track segments:
- a thermal transfer member, comprising:
  - a first surface operative to receive a plurality of switching devices, wherein the plurality of switching devices selectively deliver current to a plurality of coils spaced along each of the plurality of track segments,
  - a second surface remote from the first surface, and
  - a thermal transfer body extending between the first surface and the second surface;
- a single support member, comprising:
  - a base including:
    - a generally planar lower surface operative to engage a fixed location,
    - an upper surface opposite the generally planar lower surface, and
    - a first length extending between a first end and a second end of the base; and
  - a support extending away from the base in a generally orthogonal direction with respect to the generally planar lower surface, the support including:
    - an inner surface,
    - an outer surface, opposite the inner surface,
    - a second length extending between a first end and a second end of the support, wherein the second length is the same as the first length, and
    - an upper surface proximate the second surface of the thermal transfer member, the upper surface, including:
      - a first side edge,
      - a second side edge, the second side edge opposite the first side edge, and
      - a continuous surface extending between the first side edge and the second side edge for the second length of the support, wherein:
      - the upper surface is configured to engage a complementary surface; and
      - the continuous surface and the complementary surface each have a smooth finish to provide contact therebetween.

2. The support system of claim 1, wherein:
- the support member is a first support member,
- the support system further comprises a second support member disposed between the thermal transfer member and the first support member, and
- the complementary surface is present on the second support member to engage the upper surface of the first support member.

3. The support system of claim 1, wherein the second surface of the thermal transfer member is the complementary surface configured to engage the upper surface of the support member.

4. The support system of claim 1, wherein the inner surface and the outer surface of the support have an anodized finish.

5. The support system of claim 4, wherein the continuous surface is untreated.

6. The support system of claim 1, further comprising a thermally conductive substrate between the continuous surface and the complementary surface.

7. The support system of claim 1, wherein at least one of the inner surface and the outer surface of the support includes a plurality of fins.

8. The support system of claim 1, wherein:
- at least a portion of the plurality of track segments are curved track segments having a first curvature, and
- the support member has a second curvature, corresponding to the first curvature.

9. The support system of claim 1, wherein the single support member further includes an upper segment of the support extending generally orthogonal from a lower segment of the support and generally parallel to the base of the single support member, wherein the upper surface of the support is on an upper surface of the upper segment.

10. The support system of claim 1, wherein:
- the base has a first width;
- the lower segment of the support has a second width less than first width; and
- the upper segment of the support has a third width greater than second width.

11. A method for removing heat from a track segment in an independent cart system, the method comprising:
- conducting heat generated by a plurality of switching devices between a first surface and a second surface of a thermal transfer member in a track segment for the independent cart system, wherein:
  - the plurality of switching devices selectively deliver current to a plurality of coils spaced along a length of the track segment,
  - the plurality of switching devices are mounted to the first surface, and
  - a thermal transfer body extends between the first surface and the second surface;
- supporting the track segment with a single support member extending between a fixed location and the track segment, wherein the single support member includes:
  - a base comprising:
    - a generally planar lower surface operative to engage a fixed location,
    - an upper surface opposite the generally planar lower surface, and
  - a first length extending between a first end and a second end of the base; and
  - a support extending away from the base in a generally orthogonal direction with respect to the generally planar lower surface, the support including:
    - an inner surface,
    - an outer surface, opposite the inner surface,
    - a second length extending between a first end and a second end of the support, wherein the second length is the same as the first length, and
    - an upper surface proximate the second surface of the thermal transfer member, the upper surface, including:
      - a first side edge,
      - a second side edge, the second side edge opposite the first side edge, and
      - a continuous surface extending between the first side edge and the second side edge for the second length of the support, wherein:
      - the upper surface is configured to engage a complementary surface; and
      - the continuous surface and the complementary surface
    - each have a smooth finish to provide contact therebetween; and
- transferring heat from the second surface of the thermal transfer member to the upper surface of the support member.

12. The method of claim 11, wherein:

the first surface is oriented toward a first side of the track segment, and the second surface is oriented generally orthogonal to the first surface.

13. The method of claim 11, wherein the inner surface and the outer surface of the support have an anodized finish.

14. The method of claim 13, wherein the continuous surface is untreated.

15. The method of claim 11 further comprising the step of transferring the heat generated by the plurality of switching devices from the second surface of the thermal transfer member to an upper surface of the support member via a thermally conductive substrate between the second surface of the thermal transfer member and the upper surface of the support member.

16. The method of claim 11, wherein at least one of the inner surface and the outer surface of the support member includes a plurality of fins.

17. The method of claim 11, wherein the track segment has a first curvature and the support member has a second curvature, corresponding to the first curvature.

18. The method of claim 11, wherein the single support member further includes an upper segment of the support extending generally orthogonal from a lower segment of the support and generally parallel to the base of the single support member, wherein the upper surface of the support is on an upper surface of the upper segment.

19. The method of claim 11, wherein:

the base has a first width;

the lower segment of the support has a second width less than first width; and the upper segment of the support has a third width greater than second width.

* * * * *